Feb. 12, 1963 C. D. KACALIEFF ET AL 3,077,224
ELASTIC RING MOUNTING APPARATUS
Filed Jan. 8, 1960 2 Sheets-Sheet 1
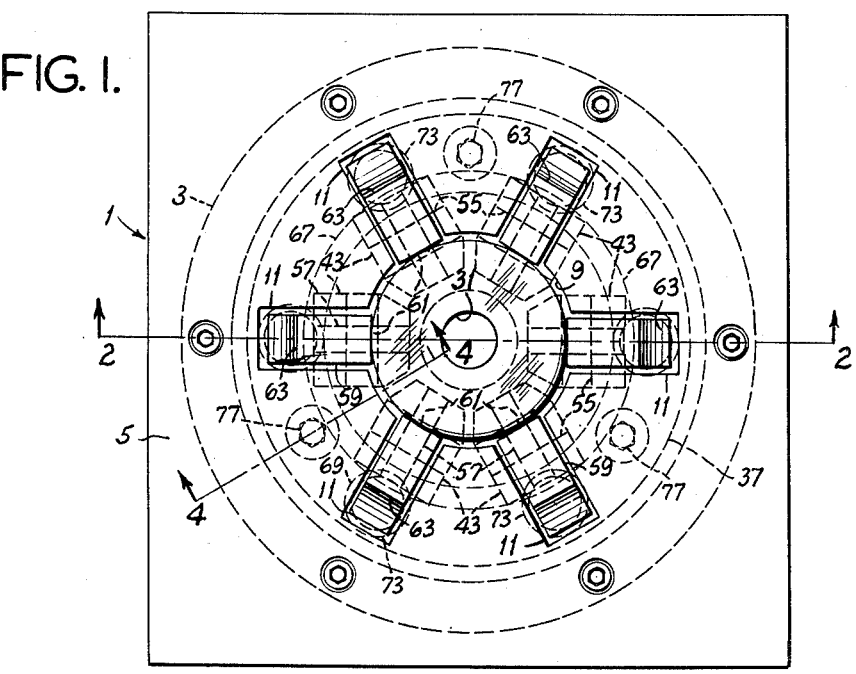
FIG. I.
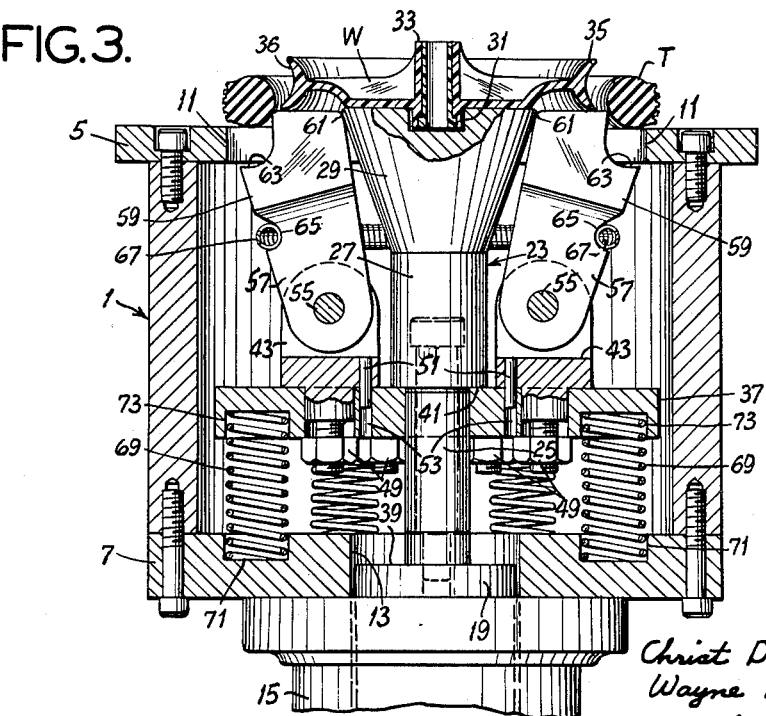
FIG. 3.
Christ D. Kacalieff,
Wayne D. Burd,
Inventors.
Koenig and Pope,
Attorneys.

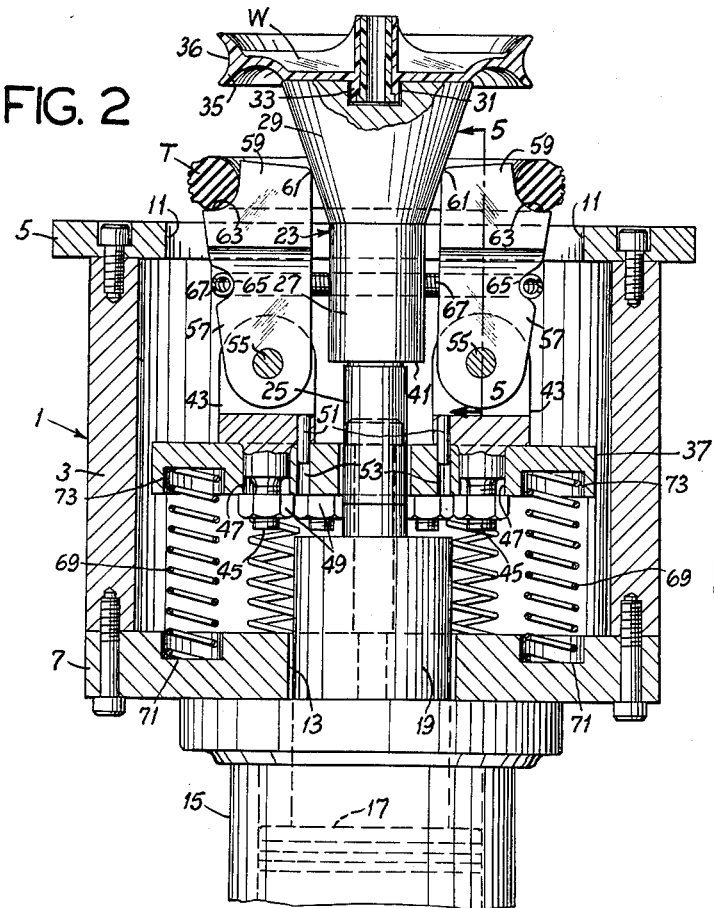

United States Patent Office 3,077,224
Patented Feb. 12, 1963

3,077,224
ELASTIC RING MOUNTING APPARATUS
Christ D. Kacalieff, Clayton, Mo., and Wayne D. Burd, Madison, Ill., assignors, by mesne assignments, to said Christ D. Kacalieff, Clayton, Mo.
Filed Jan. 8, 1960, Ser. No. 1,260
8 Claims. (Cl. 157—1.1)

This invention relates to elastic ring mounting apparatus, and more particularly to apparatus for mounting small rubber tires on wheels.

Small rubber tires are mounted on wheel rims by expanding or stretching the tire to the point where its internal diameter is greater than the diameter of the wheel, assembling the stretched tire and wheel with the tire surrounding the wheel, and then allowing the tire to contract into the groove provided therefor in the wheel rim. Tires of this class may be made of low-quality rubber, and may be unable to withstand any substantial expansion. Accordingly, an object of this invention is the provision of improved apparatus for expanding a tire and mounting it on a wheel with minimum stretching of the tire. Among other objects of the invention may be noted the provision of an apparatus such as described which is adapted for easy application thereto of a tire and a wheel to be assembled, and for easy removal of the completed wheel and tire assemblies; and the provision of apparatus such as described which is economical to manufacture and simple and reliable in operation. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is a plan view of an apparatus of this invention;

FIG. 2 is a vertical section taken on line 2—2 of FIG. 1 and illustrating parts in an initial position;

FIG. 3 is a view similar to FIG. 2 illustrating parts in a moved position;

FIG. 4 is a fragmentary section taken substantially on line 4—4 of FIG. 1, illustrating parts in the FIG. 3 position;

FIG. 5 is a vertical section taken on line 5—5 of FIG. 2; and,

FIG. 6 is a cross section of a completed wheel and tire assembly.

Corresponding reference characters indicate corresponding parts throughout the several views of the drawings.

Referring to the drawings, an apparatus constructed in accordance with this invention is shown to comprise a base generally designated 1 comprising a vertical cylindrical casing 3 having upper and lower end heads 5 and 7. The upper end head 5 is of rectangular shape and constitutes a table. It has a central circular opening 9 and a series of radial slots 11 (six such slots being shown) extending radially outward from opening 9 spaced at equal intervals around opening 9. The lower end head 7 has a central opening 13. The entire base 1 is mounted on top of an air cylinder 15 in which is slidable a piston 17. Extending upward from piston 17 through opening 13 is a piston rod 19. This has a screw-threaded stem 21 extending upward from its upper end. A wheel support 23 is threaded on the stem 21 and extends upward from piston rod 19 through opening 9 in table 5. Wheel support 23 has a lower cylindrical end portion 25 constituted by a cylindrical rod of smaller diameter than the piston rod 19, an intermediate vertical cylindrical portion 27 of larger diameter than rod portion 25 at the upper end of rod portion 25, and an upper portion 29 of inverted cone shape flaring outward at the upper end of intermediate portion 27.

The cone 29 is adapted to support a wheel W flatwise on its upper (large) end, which may be provided with a central recess 31 for receiving the hub 33 of the wheel. The wheel is illustrated as a disk wheel, having a rim 35 formed to provide an annular peripheral groove 36 for receiving a solid rubber tire T. When piston 17 is at the upper limit of its stroke (FIG. 2), the wheel support 23 occupies a raised position wherein its upper end is above the table 5, the lower end of the cone 29 then being approximately at the same level as the top of the table 5. When the piston 17 is driven downward, the wheel support 23 is pulled downward, the stroke of piston 17 being such that the cone 29 is then brought downward to a position wherein its upper end is approximately at the same level as the top of the table. Suitable valve means (not shown) is provided for operating the air cylinder 15 as will be readily understood.

A plate 37 is slidable on portion 25 of wheel support 23 between the limits, relative to support 23, imposed by engagement of the plate with the shoulder 39 constituted by the upper end of the piston rod 19 and the shoulder 41 at the lower end of portion 27 of wheel support 23. Secured on top of the plate 37 is a circular series of clevises 43 (six being shown) spaced at equal intervals around the portion 25 of rod extension 23. As shown, each clevis has a screw-threaded stem 45 extending down through a hole 47 in plate 37, a nut 49 being threaded up on the stem against the bottom of the plate. Each clevis is positively held in radial position in relation to the vertical axis of the apparatus by means of a pin 51 extending down from the clevis into a hole 53 in plate 37. Pivoted at 55 in each clevis is a tire-stretching finger 57. The clevises being radially positioned, these fingers (six being shown) lie in radial planes, being arranged in a circle around the vertical axis of the apparatus and lying outward of the wheel support 23. The fingers extend upward from plate 37 through the radial slots 11 in table 5. Each finger inner edge portion 61 engageable with the cone 29 and an arcuate tire-receiving recess 63 at its outer corner. Below their upper end portions 59, the fingers have notches 65 in the outer edges thereof receiving an annular coil spring 67 which functions to bias the fingers to swing radially inward toward the cone 29 to maintain engagement between edge portions 61 of the fingers and the cone.

Plate 37 carrying the tire-stretching fingers 57 is biased axially upward by coil compression springs 69 having their lower ends seated in recesses 71 in lower end head 7 and their upper ends received in recesses 73 in the bottom of plate 37. Upward movement of plate 37 is limited, relative to base 1, by engagement of the plate with stop means constituted by heads 75 on studs 77 extending upward from end head 7 through holes 79 in plate 37, the latter being slidable on these studs. When the plate 37 is at the upper limit of its movement, as determined by its engagement with the heads 75 on the studs 77, the fingers 57 extend upward through slots 9 above the table 5 as illustrated in FIG. 2. When the plate 37 is in this raised position, and with wheel support 23 raised, shoulder 41 is above the plate and edge portions 61 of the fingers engage the surface of the cone 29 adjacent its lower (small) end (see FIG. 2). Accordingly, spring 67 holds the fingers 57 in the contracted position in which they are illustrated in FIG. 2.

Operation is as follows:

With the piston 17 at the upper limit of its stroke, the wheel support 23 occupies its raised FIG. 2 position wherein its upper end is above the table 5 and above the upper ends of the fingers 57. The latter occupy their raised FIG. 2 operative position extending upward above the table and are contracted for reception of a tire T, the tire-receiving recesses 63 being just above the table. With the fingers 57 contracted, the circle defined by the inner edges of recesses 63 is slightly smaller than the internal diameter of the unstretched tire T. A tire T is placed over the upper end of the cone 29 and positioned in the recesses 63 as shown in FIG. 2. A wheel W is placed on the cone 29 as shown in FIG. 2. Then, air cylinder 15 is operated to drive piston 17 down and pull the wheel support 23 downward. As the cone 29 moves down, it wedges the fingers 57 radially outward against the bias of spring 67. This stretches or expands the tire T. During the initial phase of downward movement of the wheel support 23 prior to engagement of shoulder 41 thereon with plate 37, plate 37 remains in its raised FIG. 2 position, and fingers 57 remain in their raised or first position of FIG. 2. This provides for an interval of lost motion between downward movement of the wheel support 23 and downward movement of the fingers. During this interval, fingers 57 expand the tire to the point where its internal diameter is greater than the diameter of wheel W, so as to permit the wheel to move down within the expanded tire. The tire need be expanded only to the point where its internal diameter is slightly greater than the diameter of the wheel.

When wheel support 23 has moved downward to the point where shoulder 41 engages the plate 37, the expansion of the tire is completed and the wheel W is about to enter the expanded tire. On the continued downward movement of wheel support 23, plate 37 is driven downward against the upward bias of springs 69 by engagement of shoulder 41 with plate 37 in unison with wheel support 23 (see FIG. 3). Fingers 57 are thereupon moved axially downward in unison with wheel support 23, ultimately being retracted from within the tire and into the slots 11 as the wheel comes into position completely within the tire. The tire then contracts into the groove 36 in the rim 35 of the wheel (see FIG. 6). This completes the mounting of the tire on the wheel, and the assembly of the tire and wheel may now be taken off the table 5, after which the air cylinder 15 is operated to return piston 17 upward to return the parts to their initial positions in readiness for the next operation. For some wheels, recess 31 in the upper end of cone 29 may be omitted, and it is then possible to utilize means for automatically sliding the wheel and tire assemblies sidewise off the table 5.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. Apparatus for mounting an elastic ring such as a rubber tire on a member such as a wheel, comprising a base, a group of ring-stretching fingers arranged around an axis and mounted for movement in axial direction from an operative position projecting from the base to a retracted position with respect to the base for withdrawing the fingers from within a ring positioned adjacent the base surrounding the fingers, said fingers also being mounted for radial movement with respect to said axis between a contracted position for reception of a ring and an expanded position for expanding the ring, means for supporting a member such as a wheel movable from an initial position toward the base to carry said member into position within a ring expanded by said fingers, said supporting means when in initial position being located outward of said base and outward of a ring positioned surrounding said fingers, means for moving said supporting means toward the base, wedge means carried by said supporting means for moving the fingers from contracted to expanded position and shoulder means carried by said wedge means for moving the fingers from their operative to their retracted position, thereby to expand the ring, position said member within the expanded ring, and withdraw the fingers from within the ring to allow the ring to contract on the said member, said fingers being pivotally mounted at their inner ends and swung radially outward to expanded position by said wedge means.

2. Apparatus for mounting rubber tires on wheels comprising a table having an opening therein, a wheel support extending upward through said opening, said wheel support being adapted for mounting of a wheel on its upper end and being movable on a vertical axis between a raised position wherein its upper end is above the table and above a tire placed on the table and a lowered position for positioning a wheel placed on the wheel support within a tire on the table, a group of tire-stretching fingers arranged around said axis and mounted for movement relative to said wheel support in axial direction from a raised position projecting upward from the table to a lowered retracted position with respect to the table for withdrawing the fingers from within a tire on the table, said fingers also being mounted for radial movement with respect to said axis between a contracted position for reception of a tire and an expanded position for expanding the tire, and means operable on downward movement of said wheel support for first spreading said fingers to expand the tire and then moving said wheel support and fingers downward to withdraw the fingers from within the expanded tire so that it may contract onto the wheel.

3. Apparatus for mounting rubber tires on wheels comprising a table having an opening therein, a wheel support extending upward through said opening, said wheel support being adapted for mounting of a wheel on its upper end and being movable on a vertical axis between a raised position wherein its upper end is above the table and a lowered position for positioning a wheel placed on the wheel support within a tire on the table, a member mounted for vertical movement relative to the wheel support on the axis of the wheel support under the table, a group of tire-stretching fingers mounted on said member, said fingers being arranged around said axis extending upward from said member and mounted for movement radially inward and outward with respect to said axis, means biasing said fingers inward toward a contracted position, stop means determining a raised position of said member and fingers wherein the upper ends of the fingers project upward above the table for engaging a tire surrounding the fingers on the table, means biasing said member upward to its raised position, and means operable on downward movement of said wheel support for first spreading said fingers to expand the tire and then moving said member and fingers downward to withdraw the fingers from within the expanded tire so that it may contract onto the wheel.

4. Apparatus for mounting rubber tires on wheels comprising a vertical cylinder, a piston therein, a table above the cylinder having an opening, a piston rod extending upward from the piston, a wheel support on said rod extending upward therefrom through said opening, said wheel support having an upper end portion of inverted cone shape adapted for mounting of a wheel on its upper end and a lower rod portion connected to said piston rod, said piston being adapted to move said wheel support between a raised position wherein its upper end is above the table and a lowered position for positioning a wheel thereon within a tire on the table, a member mounted for vertical sliding movement on said lower rod portion of said wheel support between the upper end of the piston rod and the upper end of said lower rod portion of said wheel support, a group of tire-stretching fingers mounted on said member, said fingers being arranged around said wheel support extending upward from said member and mounted for movement radially inward and outward with respect to said wheel support, means biasing said fingers to move inward into engagement with said cone-shaped upper end portion of said wheel support, stop means determining a raised position of said member and fingers wherein the upper ends of the fingers project upward above the table for engaging a tire surrounding the fingers on the table, means biasing said member upward to its raised position, said cone-shaped upper end portion of said wheel support being operable on downward movement of said wheel support to spread said fingers to expand the tire, and said wheel support having a shoulder engageable with said member when said fingers have been spread for moving said member and fingers downward to withdraw the fingers from within the expanded tire so that it may contract onto the wheel.

5. Apparatus as set forth in claim 4 wherein said fingers are pivotally mounted on said member for swinging movement in radial planes, the upper inner end portions of the fingers being engageable with said cone-shaped upper end portion of the wheel support.

6. Apparatus as set forth in claim 5 wherein each finger has a tire-receiving recess at its upper outer end portion.

7. Apparatus as set forth in claim 5 wherein the means biasing the fingers inward comprises an annular coil spring surrounding the fingers.

8. Apparatus for mounting an elastic ring such as a rubber tire on a member such as a wheel, comprising a base, a group of ring-stretching fingers arranged around an axis and mounted for movement in axial direction from an operative position projecting from the base to a retracted position with respect to the base for withdrawing the fingers from within a ring, said fingers also being mounted for radial movement with respect to said axis between a contracted position for reception of a ring and an expanded position for expanding the ring, means for supporting a member such as a wheel movable from an initial position toward the base to carry said member into position within a ring expanded by said fingers, means for moving said supporting means toward the base, for moving the fingers from contracted to expanded position and for moving the fingers from their operative to their retracted position, thereby to expand the ring, position said member within the expanded ring, and withdraw the fingers from within the ring to allow the ring to contract on the said member, said fingers being pivotally mounted at their inner ends and adapted to be moved radially outward to expanded position, wedge means, carried by said supporting means and means mounting the fingers for limited axial movement relative to said supporting means to provide for a lost motion interval between the movement of the supporting means toward the base and the movement of the fingers toward their retracted position, said wedge means being movable with said supporting means and acting to move the fingers from contracted to expanded position during the lost motion interval.

References Cited in the file of this patent
UNITED STATES PATENTS

| | | |
|---|---|---|
| 220,995 | Shedlock | Oct. 8, 1879 |
| 1,578,760 | Replogle | Mar. 30, 1926 |
| 2,194,936 | Hatch | Mar. 26, 1940 |
| 2,574,195 | Sherrick | Nov. 6, 1951 |

FOREIGN PATENTS

| | | |
|---|---|---|
| 627,563 | Germany | Mar. 18, 1936 |